(12) United States Patent
Yoshii (10) Patent No.: US 8,256,902 B2
(45) Date of Patent: Sep. 4, 2012

(54) ENTIRE VISUAL-FIELD PROJECTION DEVICE, AND ENTIRE-VISUAL-FIELD IMAGE SYSTEM

(76) Inventor: Satoru Yoshii, Tokyo (JP)

( * ) Notice: Subject to any disclaimer, the term of this patent is extended or adjusted under 35 U.S.C. 154(b) by 351 days.

(21) Appl. No.: 12/733,431

(22) PCT Filed: May 22, 2009

(86) PCT No.: PCT/JP2009/059416
§ 371 (c)(1),
(2), (4) Date: Mar. 1, 2010

(87) PCT Pub. No.: WO2009/147955
PCT Pub. Date: Dec. 10, 2009

(65) Prior Publication Data
US 2010/0208213 A1    Aug. 19, 2010

(30) Foreign Application Priority Data

Jun. 4, 2008  (JP) .................................. 2008-147504
Dec. 26, 2008 (JP) .................................. 2008-333126

(51) Int. Cl.
*G03B 21/28*  (2006.01)
*G03B 21/14*  (2006.01)
*G03B 37/00*  (2006.01)

(52) U.S. Cl. ................. 353/98; 353/99; 353/97; 352/69

(58) Field of Classification Search .................... 353/98, 353/99, 7, 10, 79, 77, 78, 119, 30, 97; 352/40, 352/41, 42, 69, 70; 434/111, 284, 285, 286, 434/287
See application file for complete search history.

(56) References Cited

U.S. PATENT DOCUMENTS

| | | | | |
|---|---|---|---|---|
| 4,464,029 A * | 8/1984 | Jaulmes | ......................... | 352/69 |
| 5,760,826 A | 6/1998 | Nayar | | |
| 6,118,474 A | 9/2000 | Nayar | | |
| 6,327,020 B1 * | 12/2001 | Iwata | ............................. | 352/69 |
| 6,409,351 B1 | 6/2002 | Ligon | | |
| 6,727,971 B2 * | 4/2004 | Lucas | ............................ | 352/85 |
| 7,210,786 B2 * | 5/2007 | Tamura et al. | .................. | 353/28 |

FOREIGN PATENT DOCUMENTS

JP          A-11-95344          4/1999
(Continued)

OTHER PUBLICATIONS

International Search Report for International Application No. PCT/JP2009/059416, issued Jun. 30, 2009.

*Primary Examiner* — William C Dowling
*Assistant Examiner* — Ryan Howard
(74) *Attorney, Agent, or Firm* — Oliff & Berridge, PLC (57) ABSTRACT

An entire-visual-field projection device which projects image information relating to an entire-visual-field image onto a spherical screen to provide the entire-visual-field image to a viewer positioned inside the screen. The projection device is provided with the spherical screen, a pair of projectors which project the entire-visual-field image onto the screen and are arranged opposite each other with the center of the screen therebetween, and a double-convex mirror for projection which reflects luminous fluxes from the projectors toward the screen and is disposed in the vicinity of the center of the screen. A projection luminous flux from one of the projectors is emitted to one of the convex surfaces of the mirror, and that from the other projector to the other convex surface of the mirror.

7 Claims, 5 Drawing Sheets

FOREIGN PATENT DOCUMENTS

| | | |
|---|---|---|
| JP | A-2001-526471 | 12/2001 |
| JP | A-2003-344962 | 12/2003 |
| JP | A-2004-530148 | 9/2004 |
| JP | A-2005-91449 | 4/2005 |
| JP | A-2005-277670 | 10/2005 |
| WO | WO 99/30197 | 6/1999 |

* cited by examiner

ENTIRE VISUAL-FIELD PROJECTION DEVICE, AND ENTIRE-VISUAL-FIELD IMAGE SYSTEM

TECHNICAL FIELD

The present invention relates to an entire-visual-field projection device and entire-visual field image system which reproduces an object image, such as a landscape, captured in an entire-visual-field range, on a screen that covers the entire-visual-field range.

BACKGROUND ART

Recently the development of an entire-visual-field image system for experiencing, while position on the ground, the sensation of an astronaut walking in space, or a diver swimming underwater is demanded.

Also lately as "healing" treatments advance, an improvement in such systems is also demanded, so that a patient can be positioned in an entire-visual-field image atmosphere.

As a prior art to meet this demand, a system to enjoy realistic panoramic images by projecting desired images onto a cylindrical screen that covers a 360° perspective has been disclosed (see Patent Documents 1 and 2 mentioned below). A system of projecting an entire sky image onto a hemispherical dome-shaped screen, such as a planetarium, is also in wide use.

PRIOR ART DOCUMENT

Patent Document

Patent Document 1: Japanese Unexamined Patent Publication No. 2003-344962
Patent Document 2: Japanese Unexamined Patent Publication No. H11-95344

SUMMARY OF THE INVENTION

Problems to be Solved by the Invention

The above mentioned demands, however, cannot be completely satisfied by a cylindrical screen and hemispherical dome screen, but could be met by a spherical screen of which the entire inner wall surface is viewed from the inside.

In other words, according to the above mentioned Patent Documents 1 and 2, an image can be completely projected at 360°, but an image cannot be simultaneously projected above and below, so it is not so powerful in terms of experiencing the sensation of an astronaut walking in space or a diver swimming underwater, for example.

For healing treatment as well, there is a demand for positioning a patient in an entire-visual-field image atmosphere truly, including above and below, so as to increase the effect of treatment.

With the foregoing in view, it is an object of the present invention to provide an entire-visual-field projection device and an entire-visual-field image system that can reproduce a true entire-visual-field image using a simple configuration.

Means for Solving the Problems

To achieve the above object, an entire-visual-field projection device of the present invention comprises: a spherical screen onto which an entire-visual-field image is projected; a pair of projection means which project the entire-visual-field image onto the screen from inside the screen and are arranged opposite each other with the center of the screen therebetween; and a double-convex light reflection means for projection which reflects luminous fluxes from the pair of projection means toward the screen and is disposed in the vicinity of the center of the screen; wherein a projection luminous flux from one of the pair of projection means is emitted to one of the convex surfaces of the light reflection means for projection, and a projection luminous flux from the other of the pair of projection means is emitted to the other convex surface of the light reflection means for projection, and wherein a non-reflection portion for shielding light reflectance is formed on a surface position where the luminous fluxes enter eyes of viewer when the luminous fluxes are reflected from the pair of projection means in the light reflection means for projection.

Further, it if preferable that in the spherical screen a seat portion for a viewer to sit on is provided and the light reflection means for projection is held by the seat portion, and the light reflection means for projection is located at a spherical center of the screen.

Still further, it is preferable that the seat portion rotates relatively with respect to the screen around the lowest portion of the bottom surface of the screen.

In addition, it is also preferable that the non-reflection portion is formed by taking a black coating material or an aluminum black-anodizing processing.

It is preferable that the light reflection means for projection is a double-convex mirror constituted by a pair of plano-convex mirrors of which convex portions are curved reflection mirrors, and of which plane sides face each other.

It is preferable that a maximum value $A_{MAX}$ of an angle A formed by a symmetry plane in the double convex mirror and a tangential plane of the surface of the curved reflection mirror satisfies the following conditional expression (1):

$$20 \leq A_{MAX} \leq 70 \text{(degrees)} \tag{1}$$

Further, an entire-visual-field image system of the present invention comprises: one of the above mentioned entire-visual-field projection devices; and an entire-visual-field imaging device which acquires image information related to the entire-visual-field image, and that has a pair of imaging means which capture images of peripheral objects and are arranged opposite each other, and that double-convex light reflection means for imaging which reflects luminous fluxes from the peripheral objects toward the pair of imaging means, respectively.

It is preferable that the light reflection means for imaging is a double-convex mirror constituted by a pair of plano-convex mirrors of which convex portions are curved reflection mirrors, and of which plane sides face each other.

It is preferable that the pair of projection means are disposed on a prolonged line of a line connecting each vertex of each surface of the double-convex mirror constituting the light reflection means for projection, and in the symmetric positions with respect to the light reflection means for projection, and that the pair of imaging means are disposed on a prolonged line of a line connecting each vertex of each surface of the double-convex mirror constituting the light reflection means for imaging, and in the symmetric positions with respect to the light reflection means for imaging.

It is preferable that common means is used for the light reflection means for projection and for the light reflection means for imaging.

The above mentioned spherical screen need not be a perfect sphere, but can allow for deformation from a perfect sphere which is required to equalize the distance from the projection means to each position on the screen.

The above phase "symmetry" or "on the prolonged line" includes the range of substantial symmetries and substantial prolonged lines. The device and system according to the present invention can be constructed even if the requirement on the above mentioned "symmetry" is not exactly satisfied.

The form of each convex surface of the double-convex mirror includes not only an spherical surface but an aspherical surface as well.

Effect of the Invention

According to the configuration of the entire-visual-field projection device and the entire-visual-field image system of the present invention, light reflection means for projection constituted by a double-convex mirror, which reflects luminous fluxes from a pair of projection means toward a spherical screen and is disposed in the vicinity of the center of the screen, is disposed, and a projection luminous flux from one of the pair of projection means is emitted to one of the convex surfaces of the light reflection means for projection and a projection luminous flux from the other of the pair of projection means is emitted to the other convex surface of the light reflection means for projection, so that the entire-visual-field image information based on luminous fluxes reflected by the light reflection means for projection is projected onto the spherical screen.

By projecting the luminous fluxes from the pair of projection means arranged opposite each other onto the spherical screen using light reflection means for projection constructed as mentioned above, images can be easily projected in all directions, including above and below.

Therefore a powerful realism can be provided in terms of experiencing the sensation of an astronaut walking in space or a diver swimming underwater, for example.

In a healing treatment as well, a patient can be positioned in an entire-visual-field image atmosphere truly, and the treatment effect can be further improved.

The entire-visual-field image system of the present invention has an entire-visual-field imaging device for acquiring the entire-visual-field image in advance, which is projected by the entire-visual-field projection device. In other words, this entire-visual-field imaging device has a pair of imaging means, which capture images of peripheral objects and are arranged opposite each other, and the luminous fluxes from the peripheral objects are reflected in each direction of the pair of the imaging means by a double-convex light reflection means for imaging.

By reflecting the luminous fluxes carrying the image information on the peripheral objects in each direction of the pair of the imaging means arranged opposite each other, using the light reflection means for imaging constructed in the double-convex form as mentioned above, the entire-visual-field image, including above and below, can be easily captured.

Because of this, the entire visual field can be projected by the entire-visual-field projection device using the entire-visual-field image acquired by the entire-visual-field imaging device. In this case, the imaging device configuration corresponds to the projecting device configuration, so the captured entire-visual-field image data can be used for projection without performing any major image transformation processing, which is extremely efficient.

In a preferred mode, a maximum value $A_{MAX}$ of an angle A formed by a symmetry plane in the double-convex mirror and a tangential plane of the surface of the spherical mirror is in the range of 20° to 70°, so each hemispherical area can be covered to at least some extent and at the same time overlapping of the imaging ranges captured by both imaging means can be decreased.

The entire-visual-field imaging device and the entire-visual-field projection device are normally separated, but a part thereof, such as the light reflection means for imaging may be used also as the light reflection means for projection. In other words, in accordance with projecting the acquired image information by the projection means disposed in a position corresponding to each imaging means onto the spherical screen via the light reflection means for projection that can also be used as the light reflection means for imaging, the entire-visual-field image, in all directions including above and below, can be projected onto the spherical screen easily and precisely.

MODE FOR CARRYING OUT THE INVENTION

Embodiments of the present invention will now be described in detail.

Figure 1:
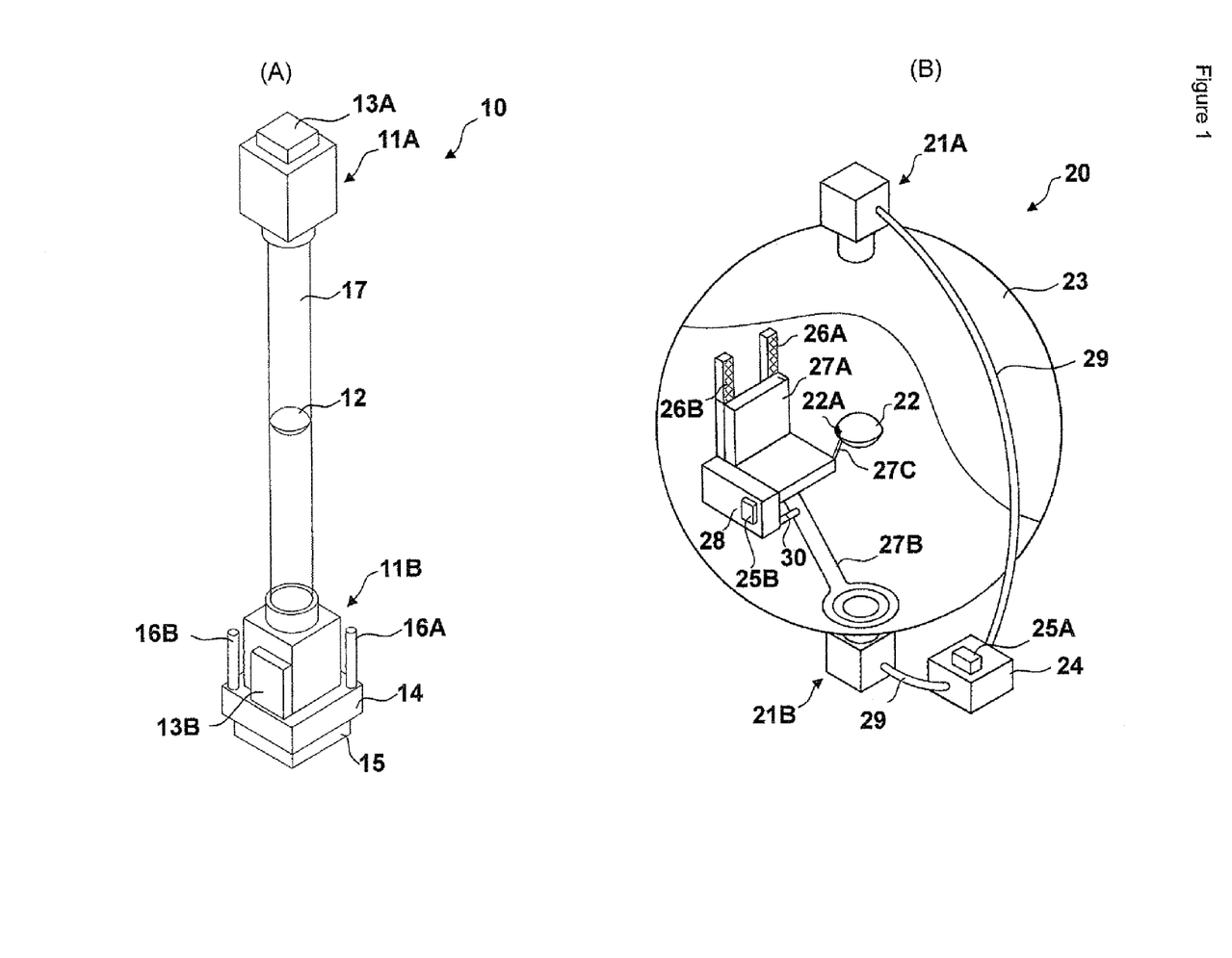
FIG. 1(A) is a schematic diagram of an entire-visual-field imaging device.
FIG. 1(B) is a schematic diagram of an entire-visual-field projection device of an entire-visual-field image system according to an embodiment of the present invention.

Concerning a basic configuration of an entire-visual-field image system according to an embodiment of the present invention, this system is comprised of an entire-visual-field imaging device 10 which captures the object image such as a landscape in the entire-visual-field range, and an entire-visual-field projection device 20 which reproduces a full range of the captured entire-visual-field image on a screen, as shown in FIGS. 1(A) and (B). The entire-visual-field projection device 20 represents the entire-visual-field projection device according to an embodiment of the present invention, and needless to say, this entire-visual-field projection device 20 can be used independently.

This entire-visual-field imaging device 10 is an entire-visual-field imaging device for acquiring image information related to the entire-visual-field image, and is comprised of: a pair of cameras (imaging means) 11A and 11B, which are arranged opposite each other and capture the images of peripheral objects (distance between the cameras 11A and 11B is 1 m, for example); and a double-convex mirror for imaging (light reflection means for imaging) 12 which reflects the luminous fluxes from the peripheral objects toward the pair of cameras 11A and 11B.

This entire-visual-field imaging device 10 also has a control unit 14 which instructs transmission and reception of image information and control signals, performs data processing and data storage of the captured image information, and instructs transmission and reception of control signals related to the image capturing operation of the image information with the entire-visual-field projection device 20 (including instruction operation to synchronize the camera 11A with the camera 11B), antenna units (signal transmission/reception means) 13A and 13B which transmits/receives image information and instruction signals between the control unit 14 and cameras 11A and 11B or between the cameras 11A and 11B, microphone units 16A and 16B for stereo which perform voice acquisition processing corresponding to the imaging processing by the cameras 11A and 11B, and an antenna unit for inter-device transmission/reception (inter-device signal transmission/reception means) 15 which sends the captured image information and acquired voice information to the entire-visual-field projection device 20. If necessary, a mirror holding tube 17 constituted by a transparent tube, which holds a double-convex mirror 12 between the cameras 11A and 11B, may be included.

The entire-visual-field projection device 20, on the other hand, projects image information related to the entire-visual-field image, onto a spherical screen (e.g. 2 m. diameter) 23, so as to provide the entire-visual-field image to a viewer positioned inside the screen, and is comprised of a spherical screen 23 onto which the entire-visual-field image is projected, a pair of projectors (projection means) 21A and 21B which project the entire-visual-field image onto the screen 23 from inside the screen 23, and are arranged opposite each other with the center of the screen 23 therebetween (distance between the projectors 21A and 21B is 2 m, for example), and a double-convex mirror for projection (light reflection means for projection) 22, which reflects the luminous fluxes from the pair of projectors 21A and 21B toward the screen, and is disposed in the vicinity of the center of the screen 23.

It is constituted such that the projection luminous flux from one of the pair of projectors 21A and 21B is emitted to one of the convex surfaces of the double-convex mirror for projection 22, and the projection luminous flux from the other is emitted to the other convex surface of the double-convex mirror for projection 22.

The entire-visual-field projection device 20 also has: a main control unit 24 which instructs transmission and reception of control signals related to the projection operation of the image information (including instruction operation to synchronize the projector 21A with the projector 21B), and performs data processing and data storage of the transmitted image information, an antenna unit (inter-device transmission/reception unit) 25A which receives the image information transmitted from the entire-visual-field imaging device 10 (or other devices), a seat portion 27A for a viewer to sit on, a leg 27B which rotatably supports the seat portion 27A centering around the lowest portion of the bottom surface of the screen 23, a holding means 27C that holds the double-convex mirror for projection 22 onto the seat portion 27A, a remote control unit 28 with which the viewer remotely instructs the projection operation, an antenna unit 25B which communicates with the antenna unit 25A for transmitting/receiving instruction signals between the remote control unit 28 and the main control unit 24, and speaker units for stereo voice reproduction 26A and 26B which perform voice reproducing processing. A wire 30 for transmitting drive signals from the remote control unit 28 to a rotary drive motor, which is disposed outside the lowest portion on the bottom surface of the screen (most of the wire is disposed inside the leg 27B). If the drive signal is radio-transmitted via the antenna unit 25A, the wire 30 may be omitted.

Both projectors 21A and 21B and the main control unit 24 are inter-connected by a cable 29 whereby the image data can be transmitted to the projectors 21A and 21B, and the respective projection operation of the projectors 21A and 21B can be synchronized.

A non-reflection portion 22A, on which non-light reflection processing is performed to protect the eyes of the viewer, is formed on the viewers side of the double-convex mirror for projection 22.

Figure 2:
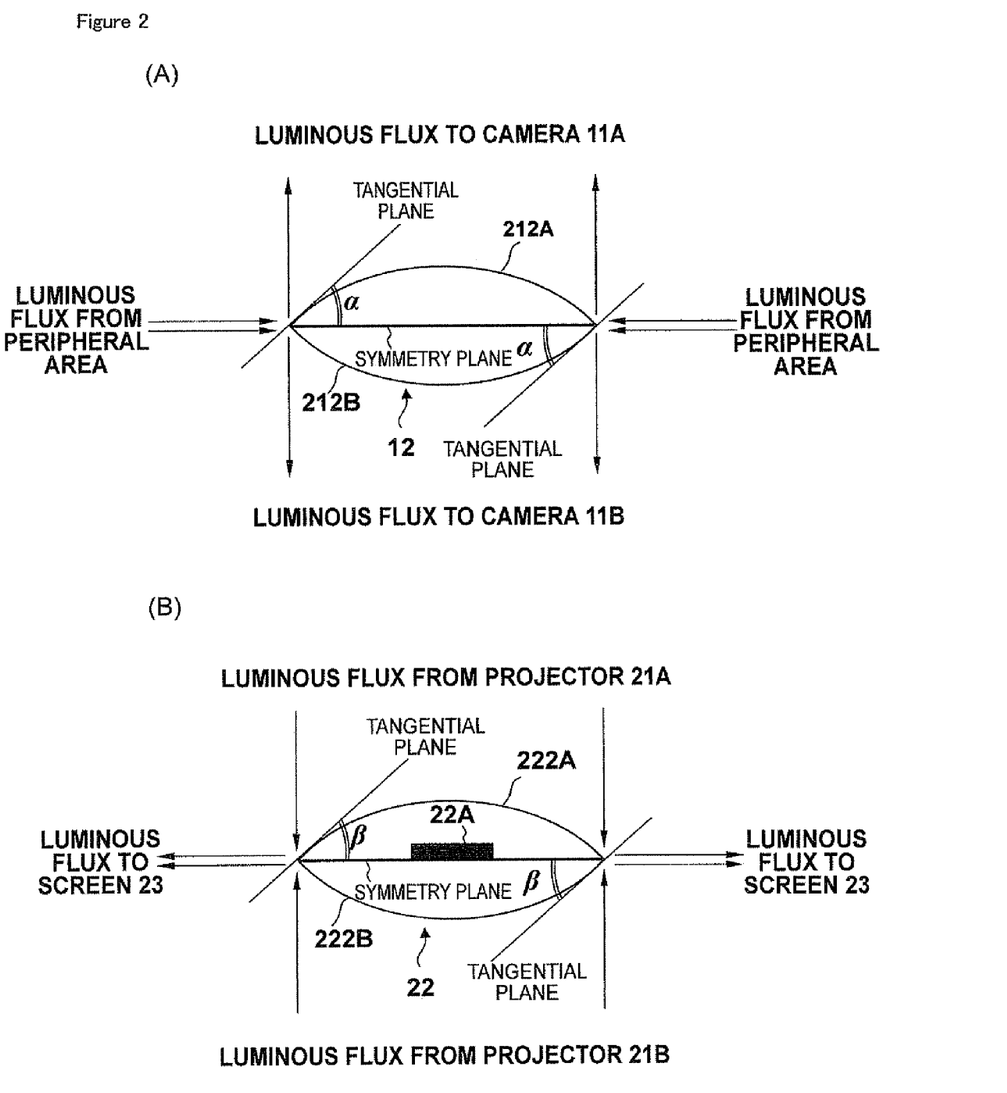
FIG. 2(A) is a diagram depicting light reflection means for imaging and FIG. 2(B) is a diagram depicting light reflection means for projection, of the entire-visual-field image system according to the embodiment of the present invention.

In the double-convex mirror for imaging 12, a pair of plano-convex mirrors, of which convex portion is a part of a sphere, are arranged such that the plane sides face each other, as shown in the cross-sectional view in FIG. 2(A). In other words, the double-convex mirror for imaging 12 is constructed such that a maximum angle α ($A_{MAX}$) formed by a symmetry plane of the double-convex mirror 12 and a tangential plane (tangential line) of the convex surface satisfies the following conditional expression (1):

$$20 \leq \alpha = A_{MAX} \leq 70 \text{(degrees)} \quad (1).$$

Therefore in this state, a wide range, or preferably the entire range of the entire visual field is covered by the range captured by the cameras 11A and 11B, and an overlap of the image ranges captured by the cameras 11A and 11B is decreased.

FIG. 2(A) shows ray tracks when a is nearly equal to 45°, and if the peripheral landscape is represented by a celestial sphere, the luminous flux from one hemisphere of the celestial sphere is reflected by one side 212A of the double-convex mirror 12, and is emitted toward the camera 11A, and the luminous flux from the other hemisphere of the celestial sphere is reflected by the other side 212B of the double-convex mirror 12, and is emitted toward the camera 11B. Thereby the images of each portion of this entire celestial sphere can be captured without missing or overlapping any portions.

In the double-convex mirror for projection 22, which is similar to the above mentioned double-convex mirror for imaging 12, a pair of plano-convex mirrors, of which convex portion is a part of a sphere, are arranged such that the plane sides face each other, as shown in FIG. 2(B). In other words, the double-convex mirror for projection 22 is constructed such that a maximum angle β ($A_{MAX}$) formed by a symmetry plane of the double-convex mirror 22 and a tangential plane (tangential line) of the convex surface satisfies the same range as the conditional expression (1).

By setting this angle, at least some degree, preferably an entire range of the celestial sphere area to be projected, is covered, and an overlap of the projection areas, projected by the projectors 21A and 21B, can be decreased.

The projection type display device is normally constructed such that the projection luminous fluxes emitted from the projection lens are diverged, so when a conventional projection type display device is used, it is preferable that the maximum angle β satisfies the following conditional expression (2), so that the images are projected onto a wider range of each hemispherical area, and also an overlap of the images projected onto each hemispheric area decreases.

$$30 \leq \beta = A_{MAX} \leq 50 \text{(degrees)} \quad (2)$$

In the same perspective, it is preferable that the maximum angle α satisfies the same range as the conditional expression (2).

FIG. 2(B) shows ray tracks when β is nearly equal to 45°, and if the screen 23 is represented by a celestial sphere, the luminous flux from one projector 21A is reflected by one side 222A of the double-convex mirror 22, and is projected onto a hemisphere of the celestial sphere, and the luminous flux from the other projector 21B is reflected by the other side 222B of the double-convex mirror 22, and is projected onto the other hemisphere of the celestial sphere. Thereby the celestial sphere image can be projected onto the screen 23 without missing or overlapping any portions.

In the double-convex mirror for projection 22, the non-reflection portion 22A is disposed, as mentioned above. The non-reflection portion 22A is a part of the mirror surface where a processing to considerably decrease the light reflectance is performed. The position where this processing is performed is a mirror surface position where the luminous fluxes reflected from the projectors 21A and 21B would enter the eyes of the viewer.

This processing mode is applied to a black coating material or an aluminum black-anodizing processing, but other processing may be used only if the light reflectance can be decreased by this processing.

Basic operation of the entire-visual-field image system will now be described.

When the entire-visual-field imaging is performed using the entire-visual-field imaging device 10, an external switch for the control unit 14 is set to ON, then the control unit 14 instructs to synchronize the camera 11B with the camera 11A via the antenna units 13A and 13B, and to capture images. Out of the peripheral object image lights, the object image lights in the upper area of the page are reflected by the top convex surface of the double-convex mirror 12, and are captured by the camera 11A. Out of the peripheral object image lights, the object image lights in the bottom area of the page are reflected by the bottom convex surface of the double-convex mirror 12, and are captured by the camera 11B.

At this time, voices are acquired via two microphones, 16A and 16B, synchronizing with the image capturing operation. Thereby both the images and voices can be synchronized and acquired. The acquired image and voice data are stored in a storage unit, which is not illustrated, in the control unit 14, and are sent to the entire-visual-field projection device 20 via the antenna unit for inter-device transmission/reception 15 at a predetermined timing (in real-time, or when an instruction is received from the outside, or when a predetermined time has elapsed after data is stored in the storage unit).

If the entire-visual-field projection device 20 is located in a remote area, the acquired image and voice data is sent to the entire-visual-field projection device 20 using a ground station s and a communication satellite, for example.

In the entire-visual-field projection device 20, the image and voice data which is radio-transmitted from the entire-visual-field imaging device 10 via the antenna unit for inter-device transmission/reception 25A (or which is separately prepared) is stored in a storage unit, which is not illustrated, of a remote control unit 28 or main control unit 24. According to the projection start instruction operation to the main control unit 24, which is performed by turning the external switch ON (e.g. operation switch disposed in the remote control unit 28), the image data stored in the storage unit is transmitted to each projector 21A and 21B via the cable 29. The image data transmitted to the projector 21A is the image data captured by the camera 11A, and the image data transmitted to the projector 21B is the image data captured by the camera 11B.

Thereby the entire-visual-field landscape that is captured can be reproduced. It is certainly possible that the image data captured by the camera 11B is the image data to be transmitted to the projector 21A, and the image data captured by the camera 11A is the image data to be transmitted to the projector 21B.

Then according to the projection start instruction signal from the main control unit 24, the luminous fluxes carrying image data are synchronously output from the projectors 21A and 21B, and are emitted toward the double-convex mirror 22.

Out of the luminous fluxes reflected by the double-convex mirror 22, the luminous flux from the projector 21A is projected onto the upper area (upper hemisphere) of the page of the screen 23, and the luminous flux from the projector 21B is projected onto the lower area (lower hemisphere) of the page of the screen 23. Thereby the entire-visual-field image is projected onto the screen 23.

In this case, the voice data stored in the storage unit is input to the manual control unit 28 via the antenna units 25A and 25B according to the voice reproduction start instruction operation based on the ON operation of the external switch (e.g. operation switch disposed in the remote control unit 28) for the main control unit 24, and is then transmitted to each speaker unit 26A and 26B.

The voice data to be transmitted to the speaker unit 26A is the voice data acquired by the microphone unit 16A, and the voice data to be transmitted to the speaker unit 26B is the voice data acquired by the microphone unit 16B. This voice data is reproduced synchronizing with the image data projection operation, as mentioned above.

By this, the voice which synchronized with the projection image can be reproduced in stereo. Needless to say, the combination may be reversed, such as synchronously reproducing the voice data to be transmitted to the speaker unit 26A with the projection of the captured image data using the camera 11A.

Now the flow of data information in the case of projecting the captured data information in real-time and the case of executing image processing and projection processing at different timing will be described in brief.

In the case of projecting the captured image information in real-time using the entire-visual-field imaging device 10 and the entire-visual-field projection device 20, the transmission/reception function of the remote control unit 28 is turned ON, and the instruction signal is radio-transmitted from the remote control unit 28 to the main control unit 24 via the antenna unit 25B and antenna unit 25A, then the main control unit 24 starts processing to acquire the image and voice data information radio-transmitted from the entire-visual-field imaging device 10 via the antenna unit 25A, and transmits the image data to the projectors 21A and 21B via the cable 29 while executing data processing on the acquired data information, and the voice data information acquired into the main control unit 24 via the antenna unit 25A reaches the antenna unit 25B via the antenna unit 25A, and then is transmitted to the speaker units 26A and 26B via the remote control unit 28 (including processing to synchronize the timings to send data information to the projectors 21A and 21B and speaker units 26A and 26B).

If the data information processed by the main control unit 24 is recorded once, instead of processing in real-time, the data information is recorded from the main control unit 24 to the recording media in the remote control unit 28 via the antenna unit 25A and antenna unit 25B. It is certainly possible to record the information in the recording media in the main control unit 24.

To project the data information recorded like this at a predetermined timing, the data information recorded in the recording media in the remote control unit 28 is radio-transmitted to the main control unit 24 via the antenna unit 25B and antenna unit 25A, and the main control unit 24 transmits the image data information to the projectors 21A and 21B via the cable 29, and the main control unit 24 or the remote control unit 28 transmits the voice data information to the speaker 26A and 26B (processing to synchronize the timings to transmit the data information to the projectors 21A and 21B and speakers 26A and 26B is also performed).

In the configuration of the entire-visual-field projection device 20 shown in FIG. 1(B), the seat portion 27A for the viewer to sit on can freely rotate around the lowest portion of the bottom surface of the screen 23 by the leg 27B. For this rotation, the switch in the remote control unit 28 is pressed to rotate the seat portion 27A, then the instruction signal from the remote control unit 28 is transmitted via the wire 30, and the drive signal is transmitted to a rotary drive motor, disposed outside the lowest portion of the bottom surface of the screen 23, which is not illustrated, whereby the seat portion 27A on which the viewer is sitting rotates around the lowest portion of the bottom surface of the screen 23. The double-convex mirror 22, which is located at the spherical center of the screen, merely rotates without changing position, even if the seat portion 27A rotates and moves, and is irradiated by the luminous fluxes from the projector 21A and projector 21B, and keeps projecting the image onto the inner wall face 23 of the screen sphere. Thereby the viewer can observe and enjoy panoramic images of the complete celestial sphere in the current position while sitting on the seat portion 27A, that is without turning around to see the projection image at the back.

It is also possible that the viewer, sitting on the seat, relatively rotates the screen 23 with respect to the seat portion 27A by pushing or pulling the inner wall face of the screen 23 using their hand or foot.

Figure 3:
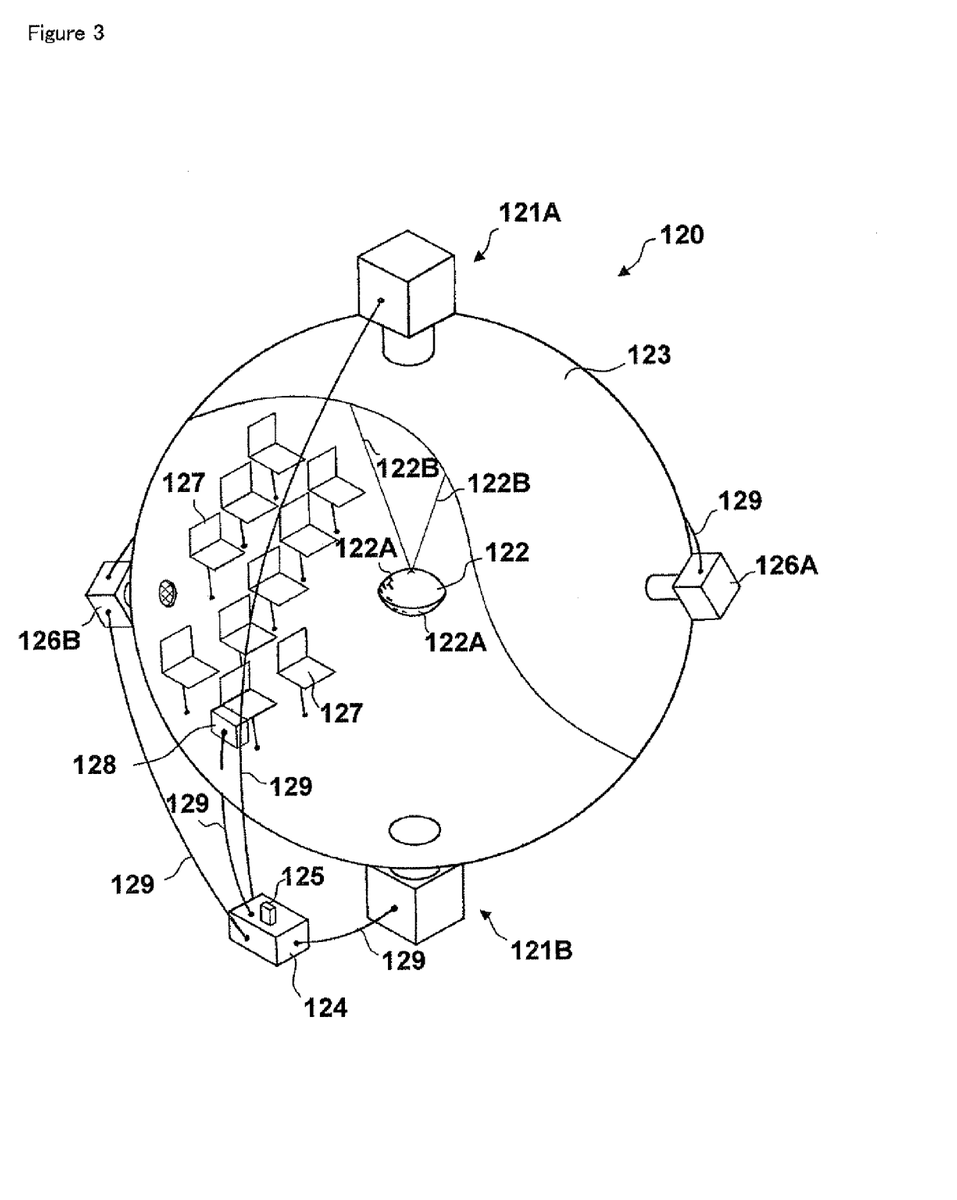
FIG. 3 is a schematic diagram of an entire-visual-field projection device according to another embodiment of the present invention.
Figure 4:
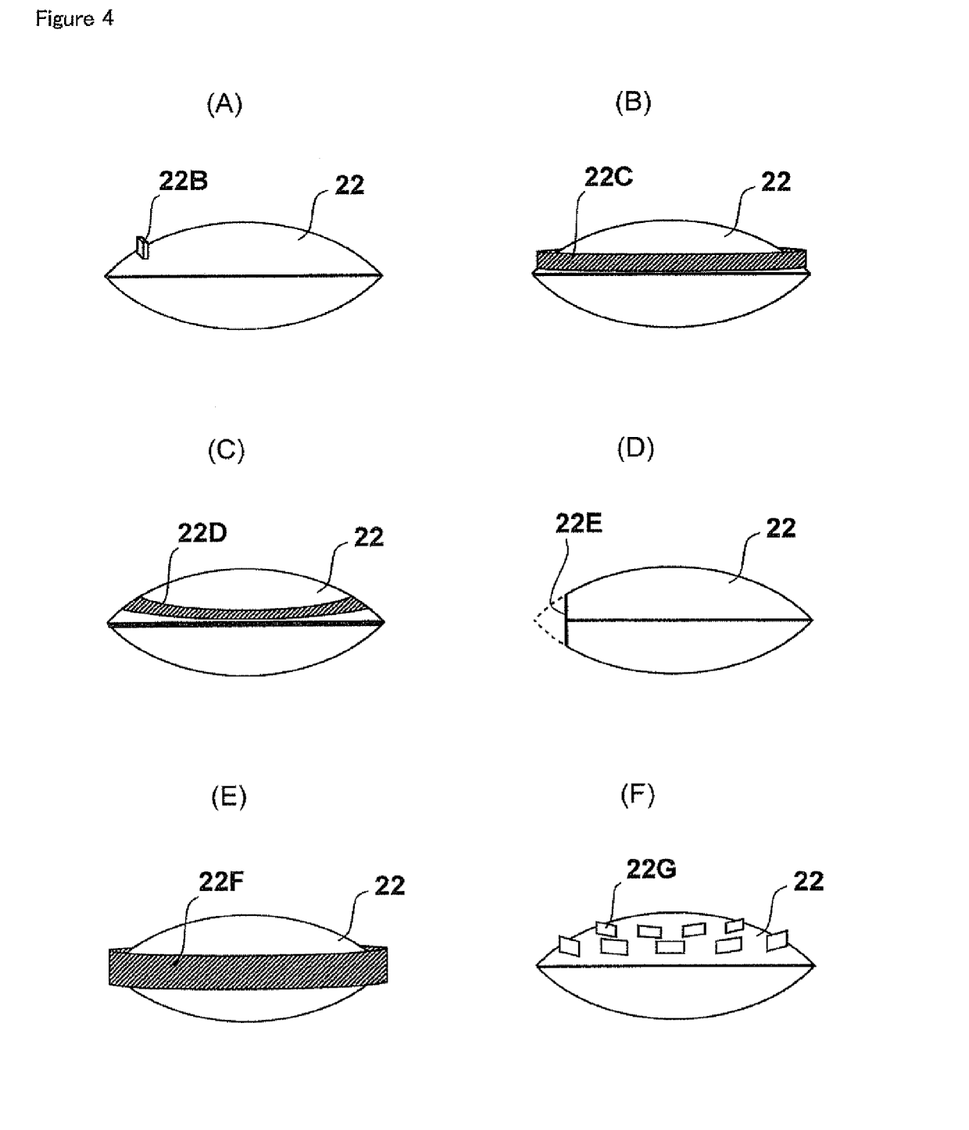
FIG. 4 are diagrams depicting variant forms of the non-reflection portion of the entire-visual-field projection device according to an embodiment of the present invention.

The entire-visual-field projection device 20 shown in FIG. 1(B) is for the viewer to enjoy alone, but the entire-visual-field projection device 120 shown in FIG. 3 allows many individuals to enjoy images at the same time. In the entire-visual-field projection device 120 in FIG. 3, each composing element having the same function as the entire-visual-field projection device 20 shown in FIG. 1(B) is denoted with a number that has 100 added to this number used in FIG. 1(B). Instead of cable communication using the cable 129, a radio communication via antennas may be used.

In the configuration of the entire-visual-field projection device 120, the double-convex mirror 122 is suspended from an upper area of the screen 123 by a transparent wire 122B, and the speaker units 126A and 126B are installed at the left and right side areas of the screen 120, so that a stereo voice can be transmitted to many viewers sitting inside the screen 120 from the speaker units 126A and 126B, synchronizing with the projection images from the projectors 121A and 121B. On the double-convex mirror 122, non-reflection portion 122A, for protecting the eyes of a viewer sitting in each seat 127, is disposed corresponding to the eyes of each viewer. Each seat 127 can be moved and adjusted in the top, bottom, left and right directions, so that the position of the eyes of each viewer can be adjusted corresponding to the non-reflection portion 122A according to the physical figure of the viewer sitting on each seat.

In each of the above embodiments, the non-reflection portion 122A is disposed on the double-convex mirror 122 so as to protect the eyes of the viewer, but as FIGS. 4(A) to (F) show, the eyes of the viewer can also be protected by three-dimensionally installing a reflected light screen 22B, C, F or G on the surface of the double-convex mirror 122, or two-dimensionally forming a non-reflection band 22D on the surface of the double-convex mirror, or creating a cut portion 22E in a part of the double-convex mirror 122 to shield the reflected light.

Figure 5:
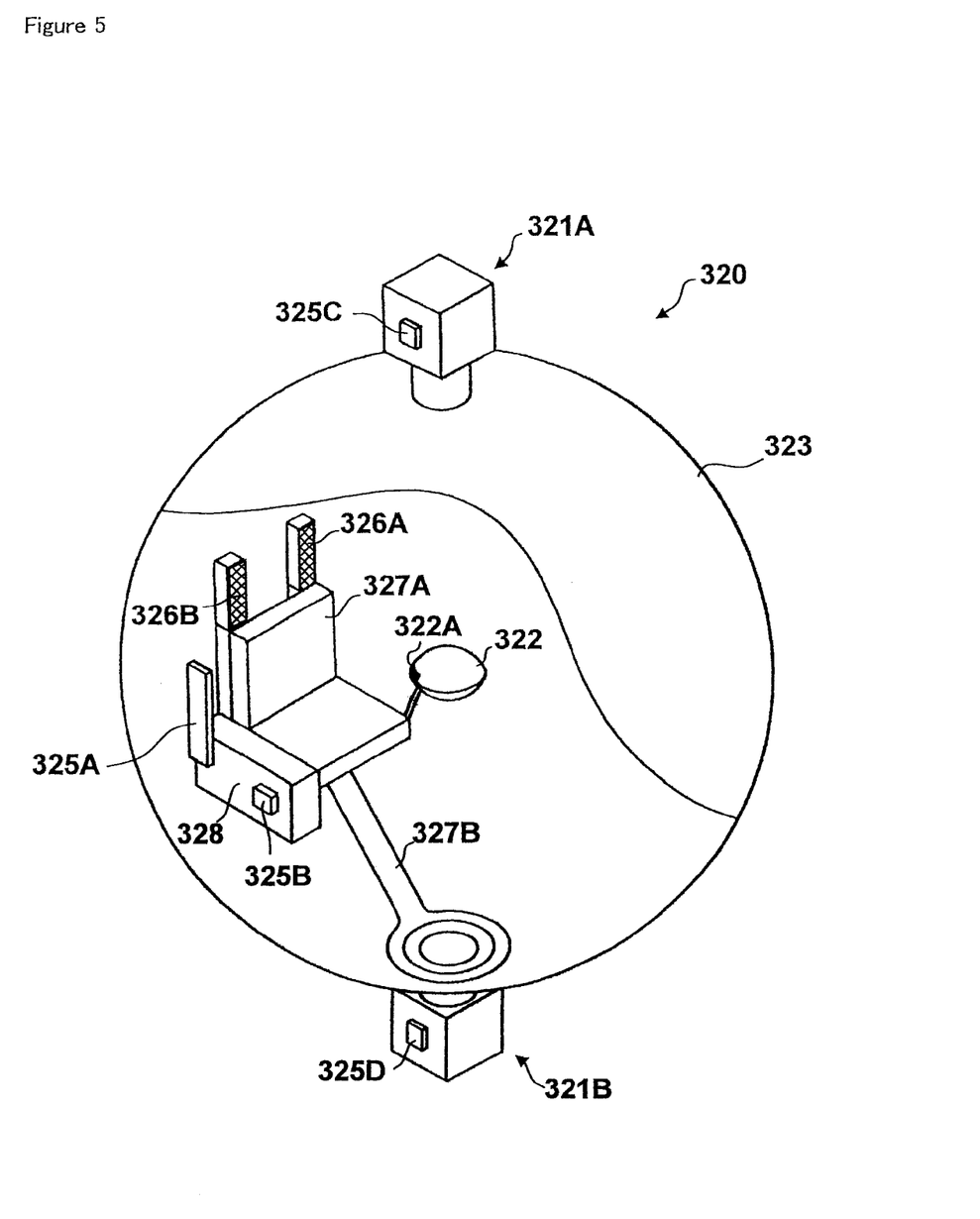
FIG. 5 is a schematic diagram of a variant form of the entire-visual-field projection device according to the embodiment of the present invention shown in FIG. 1.

The entire-visual-field projection device 320 shown in FIG. 5 is a variant form of the entire-visual-field projection device 20 in FIG. 1(B).

The basic configuration of the entire-visual-field projection device 320 is similar to that of the entire-visual-field projection device 20, where a similar composing element is denoted with a number that has 300 added to the reference number of the corresponding element of the device in FIG. 1(B), but a major difference is that the transmission/reception between the remote control unit 328 and the projectors 321A and 321B are performed wirelessly. Also the antenna unit (inter-device transmission/reception unit) 325A, which receives the image information sent from the entire-visual-field projection device (or another device), is disposed inside the screen 323, and the remote control unit 328 of the viewer instructs transmission/reception of the image and voice data information (including instruction operation to synchronize the projector 321A with the projector 321B), and executes data processing and data storage of the received image information.

The remote control unit 328 is operated by the switch unit disposed on the surface of the remote control unit 328, and transmission/reception between the remote control unit 328 and the projectors 321A and 321B are executed via each antenna unit 325B, 325C and 325D.

To project the acquired information in real-time using the entire-visual-field imaging device 10 and the entire-visual-field projection device 320, the transmission/reception function of the remote control unit 328 is turned ON, then the remote control unit 328 starts processing to acquire the image and voice data information radio-transmitted from the entire-visual-field imaging device 10 via the antenna unit 325A, and radio-transmits the data information to the projectors 321A and 321B via the antenna units 325B, 325C and 325D while performing data processing on the acquired image data information (including processing to synchronize the timing to transmit to the projectors 321A and 321B). The voice data is transmitted directly from the remote control unit 328 to the speaker units 326A and 326B.

If the processed data information is stored in the remote control unit 328 instead of processing information in real-time, the data information is recorded in the recording media in the remote control unit 328.

To project the data information recorded like this later, image data information, out of the data information recorded in the recording media in the remote control unit 328, is radio-transmitted to the projectors 321A and 321B via the antenna unit 325B and antenna units 325C and 325D (including processing to synchronize timings to transmit the image data information to the projectors 321A and 321B), and voice data information is directly transmitted from the remote control unit 328 to the speaker units 326A and 326B (including processing to synchronize timings to transmit the voice data information to the projectors 321A and 321B and the speaker units 326A and 326B).

In the entire-visual-field image system of the present invention, the entire-visual-field projection device and the entire-visual-field imaging device may share a part thereof in order to make space and insure cost efficiency, and in this case, the projection means and imaging means are integrated (e.g. device housing is shared, a common lens is used for the imaging lens and the projection lens, or common prism is used for a color composition prism and color separation prism), or it may be constructed such that projection means and imaging means can be spatially exchanged. In these cases, common means may be used for the light reflection means for imaging and for the light reflection means for projection. Thereby the device can be simplified.

In this case the image of objects outside may be captured by folding up the screen when the entire-visual-field imaging device is activated. The screen in this case may be automatically folded up, synchronizing with the drive of the entire-visual-field imaging device.

The entire-visual-field projection device and the entire-visual-field image system of the present invention can be applied to various usages including the following.

The entire-visual-field imaging device is installed in a coral reef environment underwater, and the image captured in this state is transmitted to the entire-visual-field projection device installed on ground via a communication line, and the entire-visual-field image of the coral reef environment underwater is reproduced by the entire-visual-field projection device in real-time.

Another example is that the entire-visual-field imaging device is suspended from an airborne helicopter, and the image captured in this state is transmitted to the entire-visual-field projection device installed on the ground via a communication line, and the entire-visual-field air image from the helicopter is reproduced by the entire-visual-field projection device in real-time.

Another example is that the entire-visual-field imaging device is installed outside a space satellite, and the image captured in this state is transmitted to the entire-visual-field projection device installed on earth via a communication line, and the entire-visual-field image of the earth and space is reproduced by the entire-visual-field projection device in real-time.

Another example is when the entire-visual-field imaging device is installed in a theatre or sports facility, and the image captured in this state is transmitted to the entire-visual-field projection device installed at another location via a communication line, and the entire-visual-field image of a theatre production or sports event is reproduced by the entire-visual-field projection device in real-time.

The entire-visual-field imaging device can also be installed in a luxury liner, in a remote controllable radio-controlled model airplane, in a remote controllable radio-controlled racing car, in a long distance train, in a human body, etc., for example, and also a radio-controlled machine or the like can be remote-controlled at the entire-visual-field projection device while watching the entire-visual-field image thereof.

In each of the above mentioned modes, real-time reproduction is not always required.

The entire-visual-field projection device and the entire-visual-field image system of the present invention are not limited to the above mentioned embodiments, but can be modified in various ways.

For example, both the light reflection means for imaging and the light reflection means for projection are double-convex mirrors constituted by a part of a spherical surface according to the above embodiments, but each convex portion can be constituted by an aspherical surface (e.g. ellipsoid, hyperboloid) or conical surface, instead of a spherical surface. The pair of plano convex mirrors constituting the double-convex mirror may be arranged opposite each other with a space therebetween.

The distance from the two imaging means (cameras) and the distance from the two projection means (projectors) to the light reflection means for imaging or the light reflection means for projection need not be the same.

The distances from each projection means (projector) to the light reflection means for projection need not be the same, and the distances from each imaging means (camera) to the light reflection means for imaging need not be the same.

In the above embodiments, the pair of imaging means (cameras) or the pair of projection means (projectors) are arranged in the top and bottom directions with the double-convex mirror therebetween, but these means may be arranged horizontally with the double-convex mirror therebetween.

In order to prevent an image of the imaging means to be projected in the image captured by the imaging means, it is preferable to create an area having a non-light reflection function similar to the non-reflection portion 22A shown in FIG. 2(B) (e.g. area processed to be black) on the surface of the double-convex mirror, for example.

It is also preferable to create an area having the non-light reflection function on the surface of the double-convex mirror by the same method as above, so that strong luminous fluxes from the projection means are not reflected by the surface of this double-convex mirror, and return to the projection means.

DESCRIPTION OF SYMBOLS

10 entire-visual-field imaging device
11A, 11B camera
12 double-convex mirror for imaging
14 control unit
13A, 13B, 25A, 25B, 125, 325A, 325B, 325C, 325D antenna unit
16A, 16B microphone unit
15 antenna unit for inter-device transmission/reception
17 mirror holding tube
20, 120, 320 entire-visual-field projection device
23, 123, 323 screen
21A, 21B, 121A, 121B, 321A, 321B projector
22, 122, 322 double-convex mirror for projection
22A, 122A, 322A non-reflection portion
24, 124 main control unit
26A, 26B, 126A, 126B, 326A, 326B speaker unit
27A, 127, 327A seat portion
27B, 327B leg
28, 128, 328 remote control unit
29, 129 cable

The invention claimed is:

1. An entire-visual-field projection device, comprising:
a spherical screen onto which an entire-visual-field image is projected;
a pair of projection means which project the entire-visual-field image onto the screen from inside the screen and are arranged opposite each other with the center of the screen therebetween; and
a double-convex light reflection means for projection which reflects luminous fluxes from the pair of projection means toward the screen and is disposed in the vicinity of the center of the screen;
wherein a projection luminous flux from one of the pair of the projection means is emitted to one of the convex surfaces of the light reflection means for projection, and a projection luminous flux from the other of the pair of the projection means is emitted to the other convex surface of the light reflection means for projection, and
wherein a non-reflection portion for shielding light reflectance is formed on a surface position where the luminous fluxes enter eyes of viewer when the luminous fluxes are reflected from the pair of projection means in the light reflection means for projection.

2. The entire-visual-field projection device according to claim 1, wherein a seat portion for a viewer to sit on is provided and the light reflection means for projection is held by the seat portion inside the spherical screen, and the light reflection means for projection is located at a spherical center of the screen.

3. The entire-visual-field projection device according to claim 1, wherein the seat portion rotates relatively with respect to the screen around the lowest portion of the bottom surface of the screen.

4. The entire-visual-field projection device according to claim 1, wherein the non-reflection portion is formed by taking a black coating material or an aluminum black-anodizing processing.

5. The entire-visual-field projection device according to claim 1, wherein the light reflection means for projection is a double convex-mirror constituted by a pair of plano-convex mirrors of which convex portions are curved reflection mirrors, and of which plane sides face each other.

6. The entire-visual-field projection device according to claim 5, wherein a maximum value $A_{MAX}$ of an angle A formed by a symmetry plane in the double-convex mirror and a tangential plane of the surface of the convex portion satisfies the following conditional expression (1):

$$20 \leq A_{MAX} \leq 70 \text{(degrees)} \tag{1}$$

7. An entire-visual-field image system, comprising:
the entire-visual-field projection device according to claim 1; and
an entire-visual-field imaging device which acquires image information related to the entire-visual-field image, and that has a pair of imaging means which capture images of peripheral objects and are arranged opposite each other, and that double-convex light reflection means for imaging which reflects luminous fluxes from the peripheral objects toward the pair of imaging means, respectively.

* * * * *